US012625706B2

(12) United States Patent
Liu et al.

(10) Patent No.: US 12,625,706 B2
(45) Date of Patent: May 12, 2026

(54) INSTRUCTION TRANSLATION METHOD AND RELATED DEVICE THEREOF

(71) Applicant: HUAWEI TECHNOLOGIES CO., LTD., Shenzhen (CN)

(72) Inventors: Xianzhe Liu, Shanghai (CN); Jianjiang Zeng, Shanghai (CN); Yandong Lv, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 18/898,309

(22) Filed: Sep. 26, 2024

(65) Prior Publication Data

US 2025/0013468 A1     Jan. 9, 2025

Related U.S. Application Data

(63) Continuation of application No. PCT/CN2023/084280, filed on Mar. 28, 2023.

(30) Foreign Application Priority Data

Mar. 31, 2022     (CN) .......................... 202210346585.7

(51) Int. Cl.
*G06F 9/30* (2018.01)
*G06F 9/455* (2018.01)
(52) U.S. Cl.
CPC .......... *G06F 9/3017* (2013.01); *G06F 9/4552* (2013.01)
(58) Field of Classification Search
CPC .............................. G06F 9/3017; G06F 9/4552
See application file for complete search history.

(56) References Cited

U.S. PATENT DOCUMENTS 6,615,300 B1     9/2003   Banning et al.
6,711,672 B1 *   3/2004   Agesen ..................... G06F 8/52
                                            712/E9.082
(Continued)

FOREIGN PATENT DOCUMENTS

CN        106873944 A       6/2017

OTHER PUBLICATIONS

Amanieu DAntras et al: "Optimizing Indirect Branches in Dynamic Binary Translators", ACM Transactions on Architecture and Code Optimization, Association for Computing Machinery, Apr. 5, 2016, total 25 pages.

(Continued)

*Primary Examiner* — Corey S Faherty
(74) *Attorney, Agent, or Firm* — WOMBLE BOND DICKINSON (US) LLP

(57) ABSTRACT

Embodiments of this application disclose an instruction translation method. The method includes: obtaining a return instruction of a function call instruction; obtaining a first address mapping result based on a second address indicated in the return instruction; storing the first address mapping result in a running stack space; and obtaining a first translation result of the return instruction, where the first translation result is a binary translation result of the return instruction, and the second translation result indicates to obtain, from a target location, an instruction indicated by the first address mapping result and execute the instruction. In this application, a running stack space of a source program is reused, thereby saving a storage space. In addition, an address of a return instruction does not need to be checked each time the return instruction is translated, thereby reducing overheads during translation and increasing program running efficiency.

20 Claims, 11 Drawing Sheets

Obtain a return instruction of a function call instruction, where the function call instruction is used to instruct to call an instruction indicated by a first address, and the return instruction is used to instruct to execute, after the instruction indicated by the first address is executed according to the function call instruction, an instruction indicated by a second address — 501

Obtain a first address mapping result based on the second address, where the first address mapping result is a mapping result of the second address — 502

Store the first address mapping result in a running stack space — 503

Obtain a first translation result of the return instruction based on the return instruction, where the first translation result is a translation result of the return instruction, and the first translation result indicates to obtain, from the running stack space, an instruction indicated by the first address mapping result and execute the instruction — 504

(56)　　　　　　　References Cited

U.S. PATENT DOCUMENTS

| | | | | |
|---|---|---|---|---|
| 7,290,253 | B1 * | 10/2007 | Agesen | G06F 8/52 |
| | | | | 711/213 |
| 9,477,453 | B1 * | 10/2016 | Ince | G06F 9/4486 |
| 9,817,642 | B2 * | 11/2017 | Xekalakis | G06F 9/4484 |
| 2009/0254709 | A1 * | 10/2009 | Agesen | G06F 8/52 |
| | | | | 719/330 |
| 2013/0024675 | A1 * | 1/2013 | Lovett | G06F 9/455 |
| | | | | 712/E9.045 |
| 2016/0179547 | A1 * | 6/2016 | Yamada | G06F 9/30054 |
| | | | | 712/239 |
| 2018/0285113 | A1 * | 10/2018 | Ko | G06F 9/30174 |

OTHER PUBLICATIONS

Raymond J. Hookway et al: "Digital FX!32: combining emulation and binary translation." Digital Technical Journal, vol. 9, Issue 1. Jan. 1, 1997, total 10 pages.

Swaroop Sridhar et al: "HDTrans: a low-overhead dynamic translator." Mar. 1, 2007, total 6 pages.

Jason D. Hiser et al: "Evaluating Indirect Branch Handling Mechanisms in Software Dynamic Translation Systems." Jul. 2011, 28 pages.

* cited by examiner

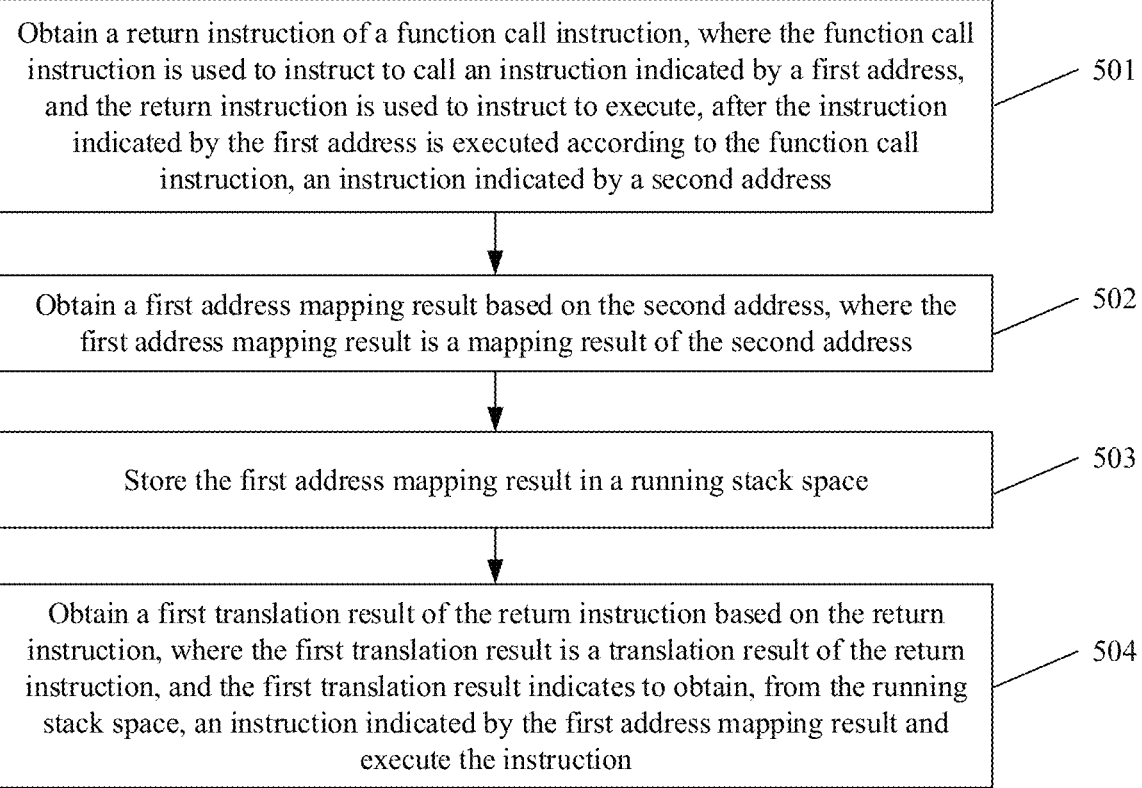

Obtain a return instruction of a function call instruction, where the function call instruction is used to instruct to call an instruction indicated by a first address, and the return instruction is used to instruct to execute, after the instruction indicated by the first address is executed according to the function call instruction, an instruction indicated by a second address — 501

Obtain a first address mapping result based on the second address, where the first address mapping result is a mapping result of the second address — 502

Store the first address mapping result in a running stack space — 503

Obtain a first translation result of the return instruction based on the return instruction, where the first translation result is a translation result of the return instruction, and the first translation result indicates to obtain, from the running stack space, an instruction indicated by the first address mapping result and execute the instruction — 504

FIG. 5

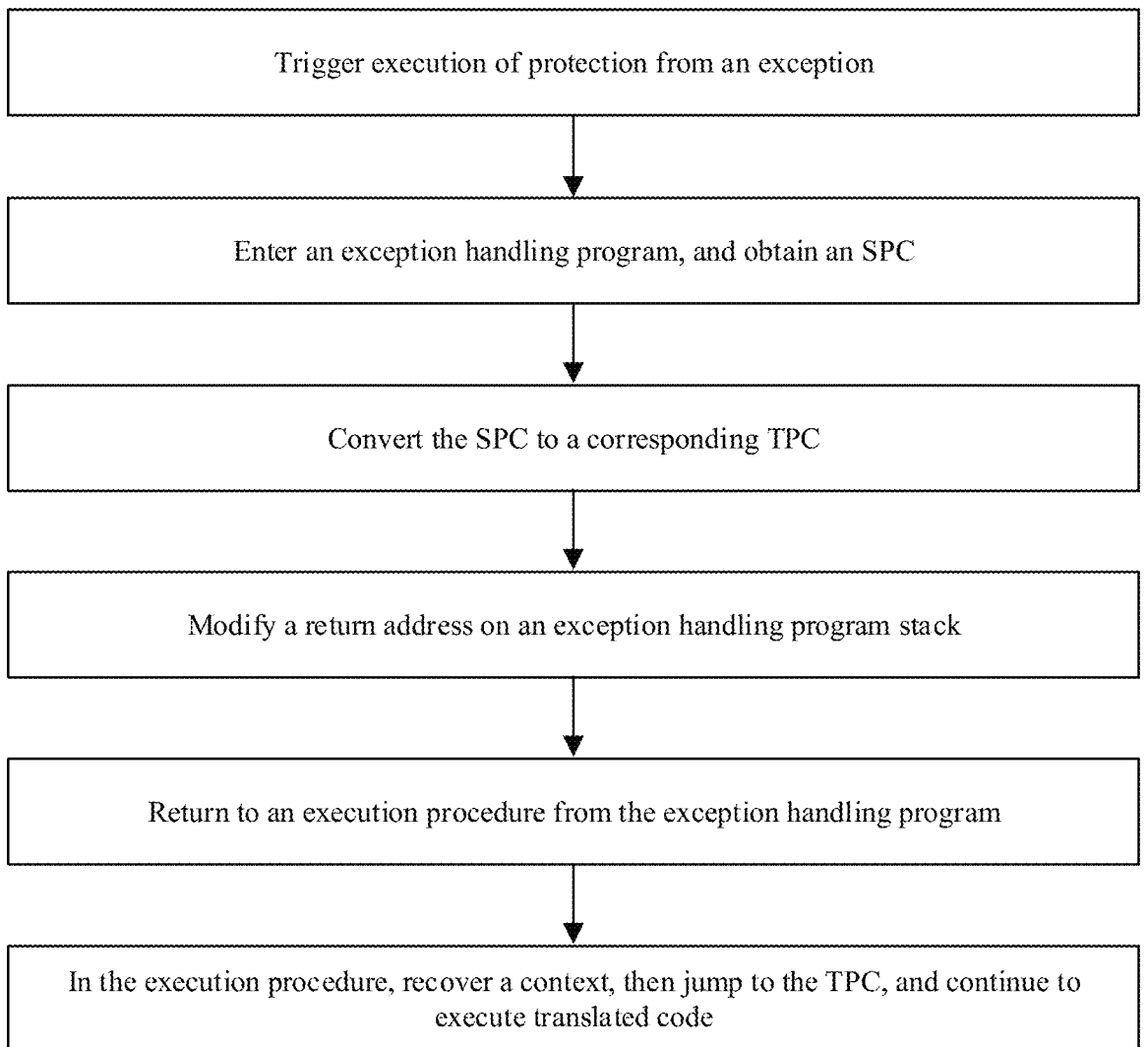

Trigger execution of protection from an exception

Enter an exception handling program, and obtain an SPC

Convert the SPC to a corresponding TPC

Modify a return address on an exception handling program stack

Return to an execution procedure from the exception handling program

In the execution procedure, recover a context, then jump to the TPC, and continue to execute translated code

FIG. 10

INSTRUCTION TRANSLATION METHOD AND RELATED DEVICE THEREOF

CROSS-REFERENCE TO RELATED APPLICATIONS

This application is a continuation of International Application No. PCT/CN2023/084280, filed on Mar. 28, 2023, which claims priority to Chinese Patent Application No. 202210346585.7, filed on Mar. 31, 2022. The disclosures of the aforementioned applications are hereby incorporated by reference in their entireties.

TECHNICAL FIELD

This application relates to the computer field, and in particular, to an instruction translation method and a related device thereof.

BACKGROUND

Binary translation (dynamic binary translation) is a technology for improving software portability and adaptability by modifying and monitoring software at a binary level during or before running. Dynamic binary translation is used as an example. Software using this technology is referred to as a dynamic binary translator (DBT). In a dynamic binary translation technology, dependency of software on hardware is avoided, so that source software runs on the dynamic binary translator instead of directly on hardware. In this way, the source software can run on a target machine.

An indirect jump instruction is a type of jump instruction. Because a target address of the indirect jump instruction is known only during running, and the value may be different each time the indirect jump instruction is executed, a target program counter (TPC) corresponding to a source program counter (SPC) cannot be obtained when the indirect jump instruction is translated. To resolve this problem, a lookup table structure is introduced into the dynamic binary translator, and each source program counter and a corresponding target program counter are stored in the lookup table. When an indirect jump instruction is executed, an SPC is obtained from a register or a memory, and then a corresponding TPC is searched for by using the SPC as an index. In a typical application, a function return instruction is an indirect jump instruction. Because a same function may be called in a plurality of different places, during a function return, an indirect jump needs to be performed for returning the function to a place in which the function is called, for further execution.

When dynamic binary translation is performed on the return instruction, if the lookup table structure needs to be accessed each time a function return is performed, context switch is frequently performed, causing a large performance loss.

SUMMARY

This application provides an instruction translation method. There is no need to use an independent data structure to store a mapping relationship between a source program counter and a target program counter of a return instruction, thereby saving a storage space. In addition, because a running stack space can sense a change of a return instruction, an address of the return instruction does not need to be checked each time the return instruction is translated, thereby reducing overheads during translation.

According to a first aspect, this application provides an instruction translation method. The method is applied to code translation, for example, may be applied to binary translation of code and other translation scenarios of code that needs to be compatible with different running conditions. For example, the method may be applied to dynamic binary translation, static binary translation, or a combination of dynamic and static binary translation of code. Dynamic binary translation may be understood as performing binary translation during running when an application is executed (that is, is run). In contrast, static binary translation may be binary translation performed offline, for example, binary translation performed before an application is run.

The method includes: obtaining a return instruction of a function call instruction, where the function call instruction is used to instruct to call an instruction indicated by a first address, and the return instruction is used to instruct to execute, after the instruction indicated by the first address is executed according to the function call instruction, an instruction indicated by a second address: obtaining a first address mapping result based on the second address, where the first address mapping result is a mapping result of the second address: storing the first address mapping result in a running stack space; and obtaining a first translation result of the return instruction based on the return instruction, where the first translation result is a translation result of the return instruction, and the first translation result indicates to obtain, from the running stack space, an instruction indicated by the first address mapping result and execute the instruction.

In one embodiment, the second address is a source program counter SPC, and the first address mapping result is a target program counter TPC of the second address.

In a current existing function return address optimization solution, an independent data structure is used to store a mapping relationship between an SPC and a TPC of a return instruction, which requires an extra storage space. In addition, when the return instruction is changed, because the independent data structure storing the mapping relationship between the SPC and the TPC of the return instruction is not sensed, the SPC of the return instruction needs to be checked each time the return instruction is translated (no matter whether the return instruction is changed), which increases overheads during translation. In this embodiment of this application, a running stack space of a source program is reused. For example, a space (for example, an SPC) that is in the stack space and that is originally used to store an address of a return instruction is used to store the first address mapping result (for example, a TPC). There is no need to use an independent data structure to store the mapping relationship between the SPC and the TPC of the return instruction, thereby saving a storage space. In addition, because the running stack space can sense a change of a return instruction, the SPC of the return instruction does not need to be checked each time the return instruction is translated, thereby reducing overheads during translation and improving program running efficiency.

In one embodiment, after the first address mapping result is obtained, a storage instruction may be generated and executed. The storage instruction may instruct to store the first address mapping result (for example, the TPC) in an address space of the return instruction in the running stack space of the source software program.

In one embodiment, the storing the first address mapping result in a running stack space includes: storing the first address mapping result at a target location in the running stack space, where the target location is a location corresponding to the second address in the running stack space.

In one embodiment, the storing the first address mapping result in a running stack space includes: replacing the second address in a target location in the running stack space with the first address mapping result, where the target location is a location corresponding to the second address in the running stack space.

In one embodiment, when the function call instruction is translated, a first address mapping result of an address (for example, the second address in this embodiment of this application) of an instruction following the function call instruction in the source software may be calculated based on a fixed offset. For example, the first address mapping result may include the TPC of the second address.

In one embodiment, the method further includes: obtaining a second translation result based on the function call instruction, where the second translation result is a translation result of the function call instruction.

In one embodiment, the function call instruction includes an SPC of the first address, and the second translation result includes a TPC of the first address.

In one embodiment, after the storing the first address mapping result in a running stack space, the method further includes: replacing the first address mapping result in the running stack space with the second address based on an access request for the second address.

In one embodiment, when a translated code block is run, an address of a return instruction (which may be briefly referred to as a return address, for example, the second address in this application) of a source software function may need to be accessed. For example, a libunwind library is loaded. Specifically, an SPC of the address of the return instruction needs to be obtained from a space of the return address in the running stack space. In this embodiment of this application, the space of the return address in the running stack space stores an address mapping result of the address of the return instruction (that is, the first address mapping result, for example, a TPC of the address of the return instruction). Therefore, the address of the return instruction needs to be recovered. In one embodiment, after the first translation result is obtained, in response to the access request for the second address, the first address mapping result in the running stack space is replaced with the second address. For example, the TPC of the return instruction may be replaced with the SPC of the return instruction.

In one embodiment, the replacing the first address mapping result in the running stack space with the second address specifically includes: replacing the first address mapping result in the target location in the running stack space with the second address.

In one embodiment, the address of the return instruction may be modified. In this case, the first address mapping result stored at the target location in the running stack space is an inaccurate translation result (TPC). To obtain an accurate translation result (TPC), a modified address (a modified second address, for example, a modified SPC) of the return instruction needs to be obtained, and the second address mapping result is obtained based on the modified address of the return instruction. The second address mapping result is a mapping result of the modified second address. An instruction indicated by the second address mapping result is executed, and the first mapping result is not executed.

In one embodiment, obtaining the second address mapping result of the second address based on the modified second address includes: performing address mapping on the modified second address, to obtain the second address mapping result.

In one embodiment, obtaining the second address mapping result of the second address based on the modified second address includes: obtaining, from the mapping relationship (for example, a preset mapping relationship between an SPC and a TPC) based on the modified second address, the second address mapping result corresponding to the modified second address; or performing address mapping on the modified second address, and obtaining the second address mapping result (for example, when the modified SPC is not found in the preset mapping relationship between the SPC and the TPC, address mapping may be newly performed on the modified SPC).

In this embodiment of this application, the accurate translation result (for example, the TPC) is obtained by using an exception handling process only when an exception occurs because a program modifies an address of a function return instruction, so that the program correctly runs (a check process does not need to be performed each time), thereby ensuring integrity and also ensuring running efficiency of the program.

According to a second aspect, this application provides an address recovery method. The method includes: obtaining an access request, where the access request indicates to access a second address in a running stack space, the second address belongs to a return instruction, the return instruction is used to instruct to execute an instruction indicated by the second address, a first address mapping result of the second address is stored in the running stack space, and the first address mapping result is a mapping result of the second address; and replacing the first address mapping result in the running stack space with the second address based on the access request.

In one embodiment, when a translated code block is run, an address of a return instruction (which may be briefly referred to as a return address, for example, the second address in this application) of a source software function may need to be accessed. For example, a libunwind library is loaded. Specifically, an SPC of the address of the return instruction needs to be obtained from a space of the return address in the running stack space. In this embodiment of this application, the space of the return address in the running stack space stores an address mapping result of the address of the return instruction (that is, the first address mapping result, for example, a TPC of the address of the return instruction). Therefore, the address of the return instruction needs to be recovered. In one embodiment, after a first translation result is obtained, in response to the access request for the second address, the first address mapping result in the running stack space is replaced with the second address. For example, the TPC of the return instruction may be replaced with the SPC of the return instruction.

In one embodiment, the first address mapping result of the second address is stored at a target location in the running stack space, and the target location is a location corresponding to the second address in the running stack space.

In one embodiment, the second address is a source program counter SPC, and the first address mapping result is a target program counter TPC of the second address.

In one embodiment, the method further includes: before the replacing the first address mapping result in the running stack space with the second address, the method further includes: generating a mapping relationship, where the mapping relationship includes a correspondence between the source program counter and the target program counter; and obtaining, from the mapping relationship, the second address corresponding to the first address mapping result.

In this embodiment of this application, in comparison with a case of maintaining the correspondence between the source program counter and the target program counter in real time, a case of generating the correspondence between the source program counter and the target program counter only when the source program counter needs to be accessed can reduce occupation for a storage resource.

According to a third aspect, this application provides an instruction translation apparatus. The apparatus includes an obtaining module and a storage module.

The obtaining module is configured to: obtain a return instruction of a function call instruction, where the function call instruction is used to instruct to call an instruction indicated by a first address, and the return instruction is used to instruct to execute, after the instruction indicated by the first address is executed according to the function call instruction, an instruction indicated by a second address; and obtain a first address mapping result based on the second address, where the first address mapping result is a mapping result of the second address.

The storage module is configured to store the first address mapping result in a running stack space.

The obtaining module is further configured to obtain a first translation result of the return instruction based on the return instruction. The first translation result is a translation result of the return instruction. The first translation result indicates to obtain, from the running stack space, an instruction indicated by the first address mapping result and execute the instruction.

In one embodiment, the storage module is specifically configured to:

store the first address mapping result at a target location in the running stack space, where the target location is a location corresponding to the second address in the running stack space.

In one embodiment, the second address is a source program counter SPC, and the first address mapping result is a target program counter TPC of the second address.

In one embodiment, the apparatus further includes:

a replacement module, configured to: after the first address mapping result is stored in the running stack space, replace the first address mapping result in the running stack space with the second address based on an access request for the second address.

In one embodiment, after the first address mapping result is stored in the running stack space, the second address is modified, and the obtaining module is further configured to:

obtain a second address mapping result based on a modified second address, where the second address mapping result is a mapping result of the modified second address.

The apparatus further includes:

an execution module, configured to: execute an instruction indicated by the second address mapping result, and skip executing the first mapping result.

In one embodiment, the obtaining module is specifically configured to:

perform address mapping on the modified second address, to obtain the second address mapping result.

In one embodiment, the obtaining module is further configured to:

obtain a second translation result based on the function call instruction, where the second translation result is a translation result of the function call instruction.

According to a fourth aspect, this application provides an address recovery apparatus. The apparatus includes an obtaining module and a replacement module.

The obtaining module is configured to obtain an access request. The access request indicates to access a second address in a running stack space. The second address belongs to a return instruction. The return instruction is used to instruct to execute an instruction indicated by the second address. A first address mapping result of the second address is stored in the running stack space. The first address mapping result is a mapping result of the second address.

The replacement module is configured to replace the first address mapping result in the running stack space with the second address based on the access request.

In one embodiment, the first address mapping result of the second address is stored at a target location in the running stack space, and the target location is a location corresponding to the second address in the running stack space.

In one embodiment, the second address is a source program counter SPC, and the first address mapping result is a target program counter TPC of the second address.

In one embodiment, the obtaining module is further configured to:

before the first address mapping result in the running stack space is replaced with the second address, generate a mapping relationship, where the mapping relationship includes a correspondence between the source program counter and the target program counter; and obtain, from the mapping relationship, the second address corresponding to the first address mapping result.

According to a fifth aspect, this application provides a terminal device. The terminal device includes a processor and a memory. The processor obtains code stored in the memory, to perform the first aspect or any one of the optional implementations of the first aspect, and the second aspect or any one of the optional implementations of the second aspect.

According to a sixth aspect, this application provides a non-volatile computer-readable storage medium. The non-volatile computer-readable storage medium includes computer instructions used to perform the first aspect or any one of the optional implementations of the first aspect and the second aspect or any one of the optional implementations of the second aspect.

According to a seventh aspect, this application further provides a computer program product, including code. When the code is executed, the first aspect or any one of the optional implementations of the first aspect is performed, and the second aspect or any one of the optional implementations of the second aspect is performed.

According to an eighth aspect, a chip is provided. The chip includes a processor. The processor is configured to perform the first aspect or any one of the optional implementations of the first aspect and the second aspect or any one of the optional implementations of the second aspect.

BRIEF DESCRIPTION OF DRAWINGS

FIG. 5 is a schematic flowchart of a binary translation method according to an embodiment;

FIG. 10 is a schematic flowchart of a binary translation method according to this application;

DESCRIPTION OF EMBODIMENTS

Figure 1:
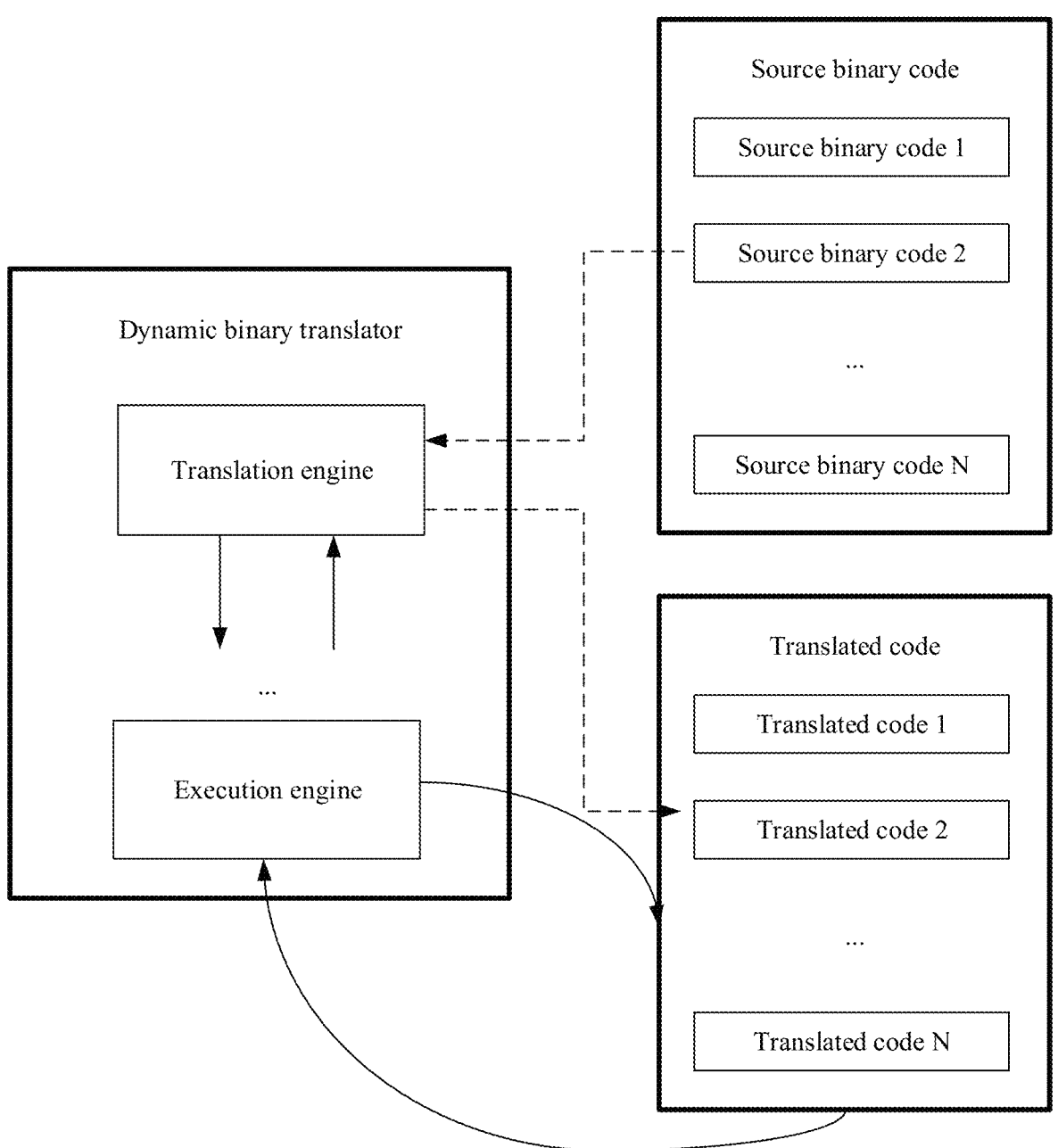
FIG. 1 is a diagram of a DBT according to this application.

The following describes embodiments of this application with reference to the accompanying drawings. It is clear that the described embodiments are merely some rather than all of embodiments of this application. Persons of ordinary skill in the art may learn that, with development of technologies and emergence of new scenarios, technical solutions provided in embodiments of this application are also applicable to a similar technical problem.

In the specification, claims, and accompanying drawings of this application, the terms "first", "second", and the like are intended to distinguish between similar objects but do not necessarily indicate a specific order or sequence. It should be understood that data termed in such a way are interchangeable in appropriate circumstances so that embodiments described herein can be implemented in orders other than the order illustrated or described herein. In addition, the terms "include", "contain" and any other variants mean to cover the non-exclusive inclusion, for example, a process, method, system, product, or device that includes a list of operations or modules is not necessarily limited to those operations or modules, but may include other operations or modules not expressly listed or inherent to such a process, method, system, product, or device. Names or numbers of operations in this application do not mean that the operations in the method procedure need to be performed in a time/logical order indicated by the names or numbers. An execution order of the operations in the procedure that have been named or numbered can be changed based on a technical objective to be achieved, provided that same or similar technical effects can be achieved.

The following describes some concepts in this application.

Binary translation is a technology by using which software on one architecture (source architecture) runs on another architecture (target architecture). Usually, the source architecture and the target architecture are two different architectures. For example, the source architecture and the target architecture may be different instruction set architectures (ISAs).

A target machine is an actual physical machine in the target architecture in embodiments of this application.

Source software is software that is expected to be migrated between architectures by using the binary translation technology.

Source binary code is binary code corresponding to an architecture on which the source software is located.

Translated code is target machine binary code obtained through binary code translation performed on the source software.

An indirect jump instruction is a type of jump instruction. A characteristic of the indirect jump instruction is that a jump target is stored in a register or a memory. When a program runs to the indirect jump instruction, only an address stored in a corresponding register or memory is a correct jump target address. If the register or the memory is accessed before the jump instruction is executed, an obtained target address may be incorrect.

Binary translation (BT) is a technology by using which binary constructed for a source ("guest") ISA is translated to binary of another target ("host") ISA. Through BT, it is possible to execute, on processors with different architectures, application binary constructed for a processor ISA, without recompiling high-level source code or rewriting assembly code.

Dynamic binary translation is a technology for improving software portability and adaptability by modifying and monitoring software at a binary level during running. Software using this technology is referred to as a dynamic binary translator (DBT). In the dynamic binary translation technology, dependency of software on hardware is avoided, so that source software runs on the dynamic binary translator instead of directly on hardware. In this way, the source software can run on a target machine.

The dynamic binary translator includes two main parts: a translation engine and an execution engine. As shown in FIG. 1, the translation engine reads source binary code of source software, and translates the source binary code into translated code on a target machine. The execution engine runs the translated code to simulate execution of the source software. Correspondingly, a running process of the source software is also divided into two parts: a translation phase and a running phase. In the translation phase, the to-be-executed source binary code is translated. After translation is completed, control is transferred to the execution engine to execute translated code, and the process proceeds to the execution phase. The execution engine finds an address of a translated instruction based on an address of a to-be-executed source instruction and executes the translated instruction. When the execution engine encounters a code segment that has not been translated, the execution engine transfers control to the translation engine for further translation. The binary translator can simulate running of the source software on the target machine by alternating the translation phase and the execution phase.

The following describes an application architecture of this application.

Figure 2:
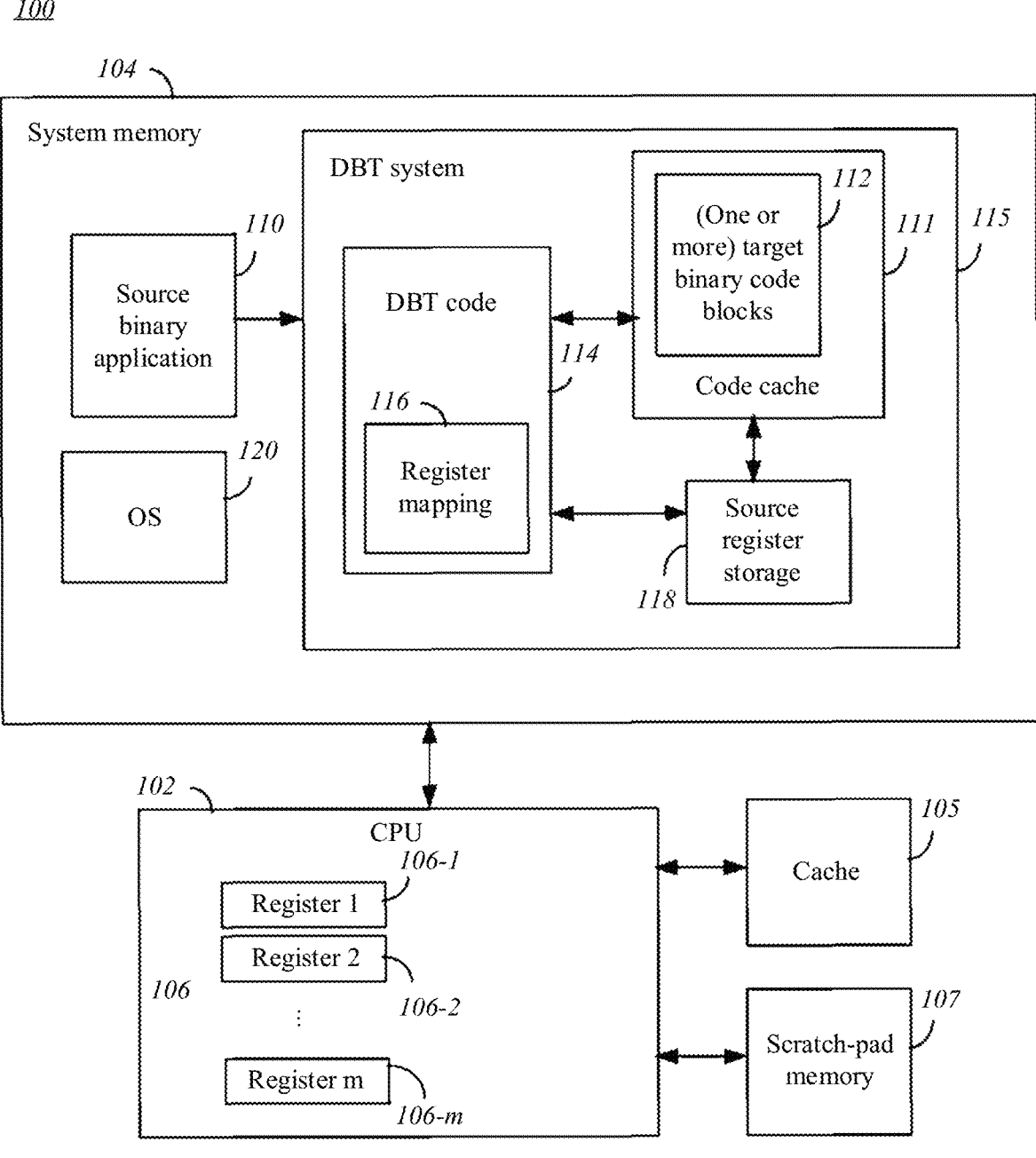
FIG. 2 is a diagram of a structure of a system according to this application.

FIG. 2 describes a system 100. The system 100 includes a processor 102 (for example, but not limited to, a central processing unit (CPU) shown in FIG. 2) coupled to a system memory 104. The system 100 may include a cache 105 (which may be included in the system memory 104) and/or a scratch-pad memory 107, similar to a cache, managed by software. The CPU 102 may include a plurality of processor registers 106-1, 106-2, . . . , and 106-$m$ that are collectively referred to as 106. The CPU 102 may include a plurality of core processing units (hereinafter "a plurality of cores" or a singular "core"). Each core may be configured to execute a plurality of threads. The system memory 104 may host a source binary application 110, a dynamic binary translation system 115, and a host operating system (OS) 120. The dynamic binary translation system 115 may include (one or more) target binary code blocks 112, a dynamic binary translator code 114 including a register mapping module 116, and/or a source register storage 118. The source binary application 110 may include a plurality of source binary code blocks corresponding to a source ISA. The (one or more) target binary code blocks correspond to a target ISA. The source binary code block is a sequence of one or more instructions.

The (one or more) target binary code blocks 112 may be stored in an area of a system memory referred to as a "code cache" 111. The code cache 111 may be understood as a storage for the (one or more) target binary code blocks 112, that is, the (one or more) target binary code blocks 112 translated from (one or more) corresponding source binary code blocks. The system memory 104 may host the source register storage 118. The source register storage 118 is configured to store data in the processor register 106 or load data from the processor register 106. In some embodiments, the cache 105 and/or the scratch-pad memory 107 are configured to store data in the (one or more) processor registers 106 or load data from the (one or more) processor registers 106.

The source binary application 110 may be operated by executing the dynamic binary translator code 114 and the register mapping module 116 by using the one or more cores, to convert (one or more) blocks of the source binary application 110 into (one or more) target binary code blocks 112. The source binary code block may be dynamically translated into the target binary code block. In other words, the source binary code block may be translated into the target binary code block in response to a call for a to-be-executed binary code block rather than statically (that is, before running). Then, the target binary code block may be stored in the code cache 111 in the system memory 104 and provided to the CPU 102 for execution.

Figure 3:
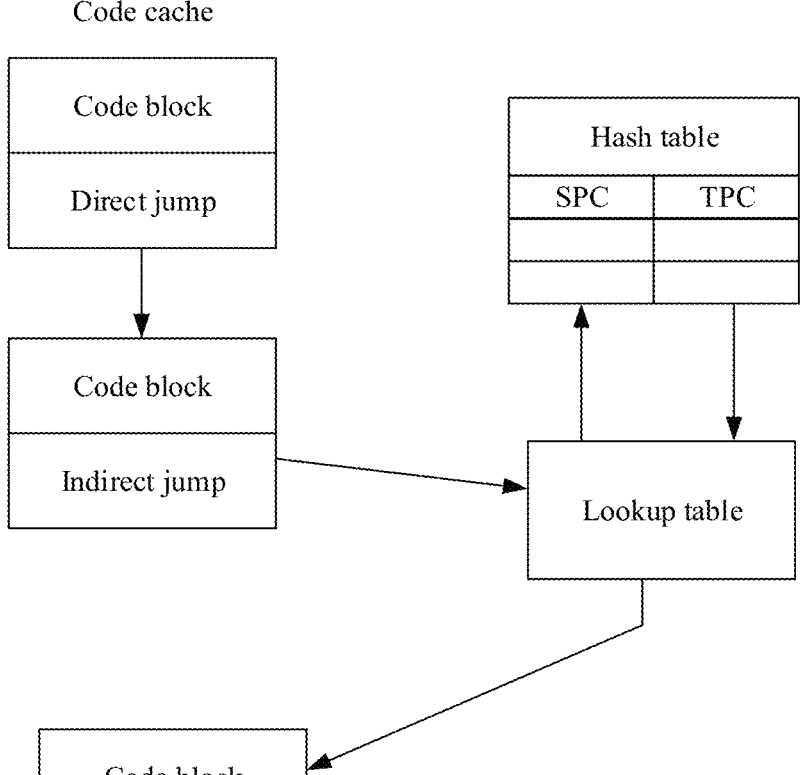
FIG. 3 is a schematic flowchart of a binary translation method.

An objective of a dynamic binary translator is to provide an execution environment compatible with a source machine, so that source software can run as efficiently as possible on a target machine. However, compatibility and efficiency are two opposites. Maximally reducing a performance loss while ensuring compatibility is a major challenge for dynamic binary translation. How to translate an indirect jump instruction (indirect branch instruction) is one of key factors that affect performance. The indirect jump instruction is a type of jump instruction. A characteristic of the indirect jump instruction is that a jump target is stored in a register or a memory. When a program runs to the indirect jump instruction, only an address stored in a corresponding register or memory is a correct jump target address. If the register or the memory is accessed before the jump instruction is executed, an obtained target address may be incorrect. Because the target address of the indirect jump instruction is known only during running, and the value may be different each time the indirect jump instruction is executed, a target program counter TPC) corresponding to a source program counter (SPC) cannot be obtained when the indirect jump instruction is translated. To resolve this problem, a lookup table structure is introduced into the dynamic binary translator, and each source program counter and a corresponding target program counter are stored in the lookup table, as shown in FIG. 3. When an indirect jump instruction is executed, an SPC is obtained from a register or a memory, and then a corresponding TPC is searched for by using the SPC as an index.

In a typical application, a function return instruction is an indirect jump instruction. Because a same function may be called in a plurality of different places, during a function return, an indirect jump needs to be performed for returning the function to a place in which the function is called, for further execution.

Figure 4:
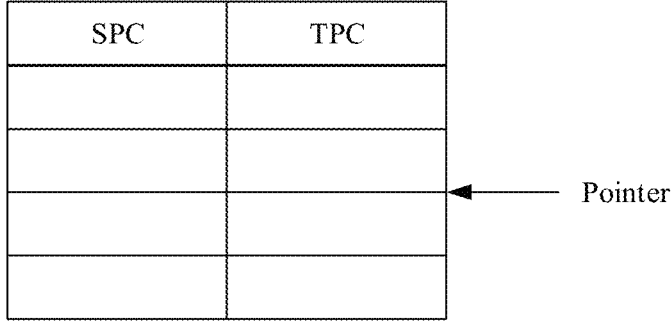
FIG. 4 is a schematic flowchart of a binary translation method.

When dynamic binary translation is performed on the return instruction, if the lookup table structure needs to be accessed each time a function return is performed, context switch is frequently performed, causing a large performance loss. The function return complies with a function calling convention, and is a regular indirect jump. Each time a function is called, a return address of the function is pushed to a top of a stack. After execution of the function ends, the return address is extracted from the top of the stack, and a jump to a called location is performed for further execution. According to this rule, an optimized return address stack (RAS) manner is proposed, as shown in FIG. 4. In addition to the lookup table structure for processing an indirect jump, a stack structure specifically for storing a function return address is constructed. A return address stack pointer (RAS pointer) is used to mark a location of a top of a stack. Each time a function is called, an SPC and a TPC are stored at the top of the stack. When the function is returned, the SPC and the TPC are extracted from the top of the stack, and the SPC is compared with a return address to determine whether the SPC and the return address are consistent. If the SPC and the return address are consistent, a jump to the corresponding TPC is performed for further execution. If the SPC and the return address are inconsistent, processing is performed according to a general indirect jump instruction. To be specific, a corresponding TPC is searched for in the lookup table structure.

Although unnecessary access to the lookup table structure is avoided and overheads for frequent context switch are reduced in the foregoing manner of a return address stack, an extra stack structure specifically used for storing a function return address is needed, which consumes more storage spaces. In addition, each time the function is called and returned, the SPC and the TPC of the function still need to be stored and obtained through the RAS, and a check operation is performed on the addresses. In this processing process, access and comparison instruction still need to be additionally generated to complete the work, which increases extra performance overheads.

To resolve the foregoing problem, an embodiment of this application provides an instruction translation method.

The following describes in detail operations of the instruction translation method provided in this embodiment by using FIG. 5. FIG. 5 is a schematic flowchart of an instruction translation method according to an embodiment of this application. As shown in FIG. 5, the instruction translation method may include the following operations.

501: Obtain a return instruction of a function call instruction, where the function call instruction is used to instruct to call an instruction indicated by a first address, and the return instruction is used to instruct to execute, after the instruction indicated by the first address is executed according to the function call instruction, an instruction indicated by a second address.

Operation 501 may be performed by a binary translator. For example, operation 501 may be performed when the binary translator performs dynamic binary translation, static binary translation, or a combination of dynamic and static binary translation on a source application.

Dynamic binary translation is used as an example. In one embodiment, operation 501 may be performed by a DBT. For example, operation 501 may be performed when the DBT performs dynamic binary translation on the source application.

Dynamic binary translation may be understood as performing binary translation during running when an application is executed (that is, is run). In contrast, static binary translation may be binary translation performed offline, for example, binary translation performed before an application is run.

In one embodiment, the DBT may perform dynamic binary translation on a source software application, and divide the source software into a plurality of source code blocks. Each time a translation engine reads a source code block, the translation engine translates the source code block into an executable translated code block on a target machine. For example, the translation engine may translate instructions in the source code block one by one until a last instruction in the source code block is translated.

In one embodiment, the DBT may sequentially translate all source software instructions. When the DBT encounters a function call instruction, the DBT may enter a function call instruction processing procedure. The function call instruction is used to instruct to call the instruction indicated by the first address. The function call instruction may include the first address.

In one embodiment, when the function call instruction is executed, a jump to the instruction indicated by the first address may be performed, the instruction indicated by the first address is executed, and then a return instruction of the function call instruction is executed. The return instruction may instruct to return to a calling instruction after the instruction indicated by the first address is executed. For example, the return instruction is used to instruct to execute, after the instruction indicated by the first address is executed according to the function call instruction, the instruction indicated by the second address. For example, the return instruction may include the second address (for example, an SPC of the second address).

In one embodiment, when the function call instruction is translated, an address (for example, the second address in this embodiment of this application) of an instruction following the function call instruction in the source software may be but not limited to be calculated based on a fixed offset.

The return instruction "return" may instruct to implement a return from a callee function (for example, the instruction indicated by the first address in this embodiment of this application) to a caller function (for example, the instruction indicated by the second address in this embodiment of this application) for further execution. A return value may be attached to the return, and is specified by a parameter following the return.

502: Obtain a first address mapping (address mapping) result based on the second address, where the first address mapping result is a mapping result of the second address.

In one embodiment, the return instruction includes the second address (that is, the source program counter (SPC)), and the first address mapping result includes a target program counter (TPC) of the second address.

In one embodiment, when the function call instruction is translated, the first address mapping result of the address (for example, the second address in this embodiment of this application) of the instruction following the function call instruction in the source software may be calculated based on the fixed offset.

In one embodiment, address mapping may be performed on the second address to obtain the first address mapping result. For example, the first address mapping result may include the TPC of the second address.

503: Store the first address mapping result in a running stack space.

When a program runs, an operating system allocates a stack space to each process, to store one or more of the following: a function call parameter, a function return address, a local variable, and a function return value when the program runs. The stack space may be increased with a call of a function, and is released with an end of the function.

In one embodiment, a target location is a location corresponding to the second address in the running stack space.

In one embodiment, after the first address mapping result is obtained, a storage instruction may be generated and executed. The storage instruction may instruct to store the first address mapping result (for example, the TPC) in an address space of the return instruction (that is, the second address) in the running stack space of the source software program.

Figure 6:
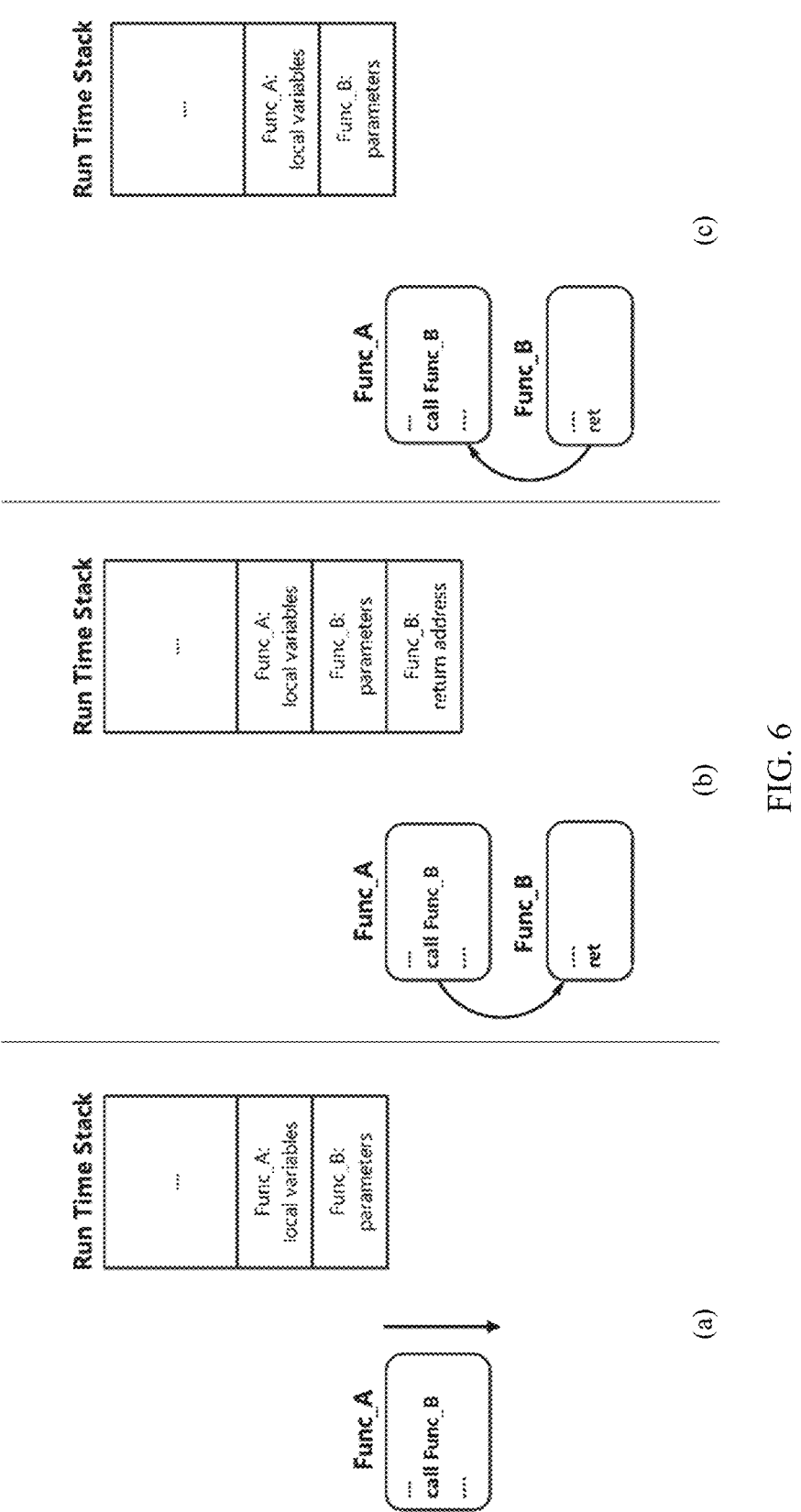
FIG. 6 is a diagram of a running stack space.

The running stack space may be referred to as a run-time stack (run-time stack) space. FIG. 6 is a diagram of a running stack space. A function Func_B is called when execution of a function Func_A proceeds to a phase. Before the function Func_A calls the function Func_B, a parameter needed by the function Func_B is put into a run-time stack (run-time stack) space in advance, as shown in (a) of FIG. 6. Then, a call Func_B instruction is executed to call the function Func_B. In this case, a return address (return address) of the function Func_B is first pushed to the run-time stack space, and then an instruction of the function Func_B is executed, as shown in (b) of FIG. 6. After execution of the function Func_B is completed, a return instruction (ret) is executed. In this case, a jump to a location following a call point in the function Func_A is performed based on the return address of the function Func_B in the run-time stack space, for further execution. Because the return address of Func_B is no longer needed, the return address is ejected out of the run-time stack space, as shown in (c) of FIG. 6.

In a current existing function return address optimization solution, an independent data structure is used to store a mapping relationship between an SPC and a TPC of a return instruction, which requires an extra storage space. In addition, when an address of the return instruction is changed, because the independent data structure storing the mapping relationship between the SPC and the TPC of the return instruction is not sensed, the SPC of the return instruction needs to be checked each time the return instruction is translated (no matter whether the return instruction is changed), which increases overheads during translation. In this embodiment of this application, a running stack space of a source program is reused. For example, a space (for example, an SPC) that is in the stack space and that is originally used to store an address of a return instruction is used to store the first address mapping result (for example, a TPC). There is no need to use an independent data structure to store the mapping relationship between the SPC and the TPC of the return instruction, thereby saving a storage space. In addition, because the running stack space can sense a change of a return instruction, the SPC of the return instruction does not need to be checked each time the return instruction is translated, thereby reducing overheads during translation.

In one embodiment, after the first address mapping result is stored at the target location, the function call instruction may be translated to obtain a second translation result.

In one embodiment, the second translation result may be obtained based on the function call instruction. The second translation result is a binary translation result of the function call instruction.

In one embodiment, the function call instruction includes an SPC of the first address, and the second translation result includes a TPC of the first address.

504: Obtain a first translation result of the return instruction based on the return instruction. The first translation result is a translation result of the return instruction. The first translation result indicates to obtain, from the running stack space, an instruction indicated by the first address mapping result and execute the instruction.

In one embodiment, when the function return instruction is translated, the first translation result may be obtained based on the return instruction. The first translation result may include a loading instruction and a jump instruction. The loading instruction may instruct to obtain the first address mapping result from the target location. The jump instruction may instruct to execute the instruction indicated by the first address mapping result.

For example, when the function return instruction is translated, the loading instruction may be generated, a TPC is extracted from a function return address space in a running stack of a source software program, and then the jump instruction is generated to implement a jump to the TPC. When translation of a source code block is completed, a control flow is transferred to an execution engine to execute a translated code block.

With reference to a specific schematic flowchart, the following describes a translation processing procedure of the function call instruction and the return instruction in this embodiment of this application. A translation processing procedure of the function call instruction may be shown in FIG. 7. A translation processing procedure of the function return instruction may be shown in FIG. 8.

Figures 7, 8:
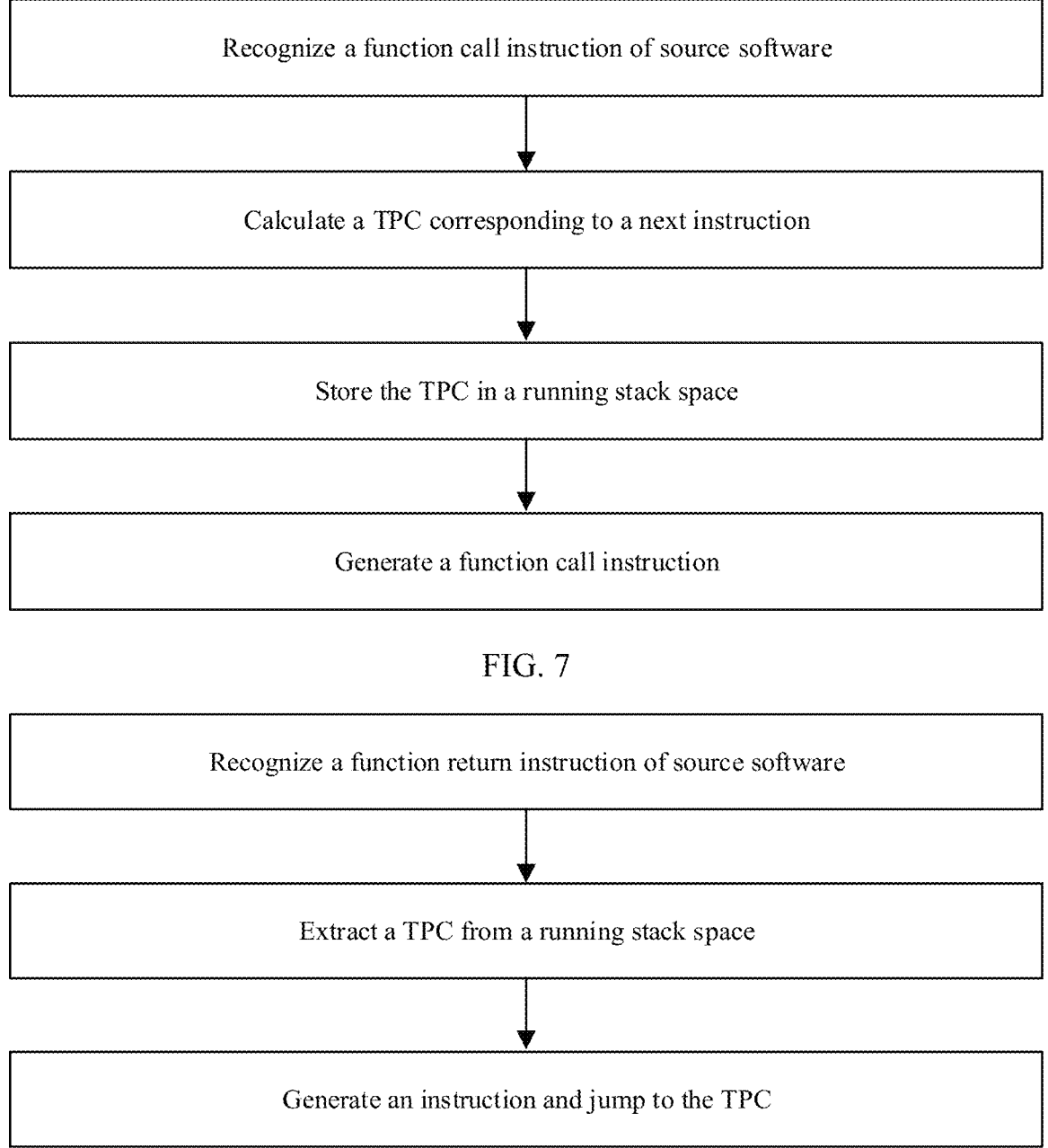
FIG. 7 is a schematic flowchart of a binary translation method according to an embodiment.
FIG. 8 is a schematic flowchart of a binary translation method according to this application.

With reference to FIG. 7, the translation processing procedure of the function call instruction may include the following operations:

(1) Sequentially translate all source software instructions, and enter a processing procedure of the function call instruction when translation proceeds to a (source) function call instruction.

(2) Calculate a TPC of an instruction (physically) following the function call instruction in source software, and use the TPC as a parameter of a next storage instruction.

(3) Generate the storage instruction, and store, at a return address in a running stack space, the TPC calculated in (2).

(4) Generate a function call instruction, and transfer a control flow to a callee function.

With reference to FIG. 8, the translation processing procedure of the function return instruction may include the following operations:

(1) Sequentially translate all source software instructions, and enter a translation processing procedure of a function return instruction when translation proceeds to the return instruction.

(2) Obtain a TPC for a function return from a running stack space.

(3) Generate a jump instruction, and transferring a function control flow to the TPC for further execution.

In one embodiment, when a translated code block is run, an address of a return instruction (which may be briefly referred to as a return address, for example, the second address in this application) of a source software function may need to be accessed. For example, a libunwind library is loaded. Specifically, an SPC of the address of the return instruction needs to be obtained from a space of the return address in the running stack space. In this embodiment of this application, the space of the return address in the running stack space stores an address mapping result of the address of the return instruction (that is, the first address mapping result, for example, a TPC of the address of the return instruction). Therefore, the address of the return instruction needs to be recovered. In one embodiment, after the first translation result is obtained, in response to an access request for the second address, the first address mapping result in the running stack space is replaced with the second address. For example, the TPC of the return instruction may be replaced with the SPC of the return instruction.

For example, in response to the access request for the address of the return instruction, the execution engine of the DBT may transfer a control flow to a function return address recovery procedure, and sequentially recover function return addresses in a program running stack space to SPCs. After recovery is completed, the control flow is transferred to the execution engine again. The execution engine may be responsible for eliminating translated code and calling the translation engine to translate the source code blocks again. In this case, when the function call instruction is translated, a function return address stack stores an SPC instead of a TPC. For translation of a function return instruction in a source code block, a loading instruction is generated to extract an SPC from the function return address space in the running stack of the source software program, and then an instruction for a jump to the execution engine is generated. After translation of the source code block is completed, the control flow is transferred to the execution engine to execute the translated code block. After execution of the translated code block is completed, the control flow is returned to the execution engine, and a next to-be-executed translated code block is found based on an SPC value for further execution.

With reference to a specific schematic flowchart, the following describes a processing process of the access request for the address of the return instruction in this embodiment of this application. The processing process of the access request for the address of the return instruction may be shown in FIG. 9.

Figure 9:
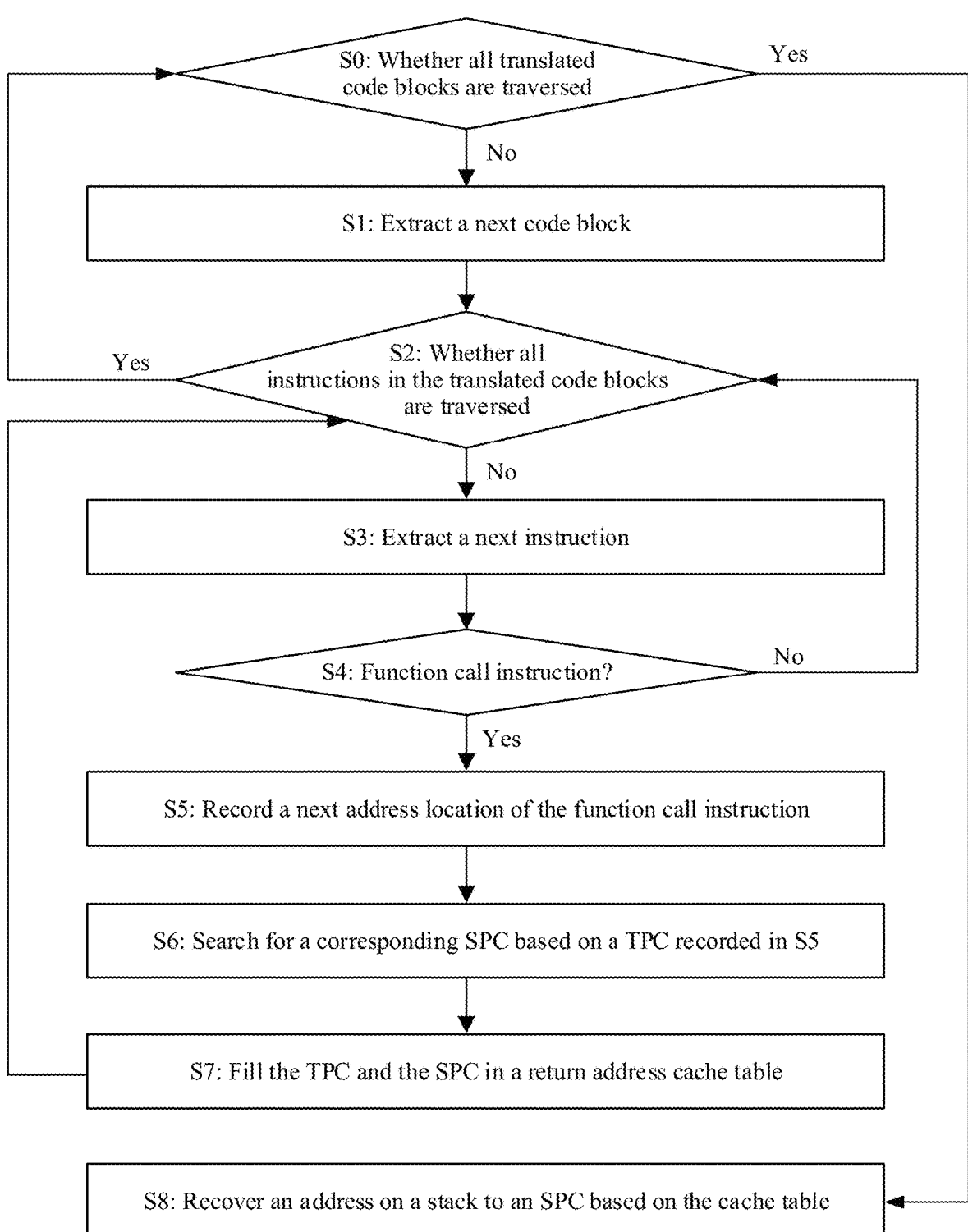
FIG. 9 is a schematic flowchart of a binary translation method according to this application.

With reference to FIG. 9, a processing process of an access request for an address of a return instruction may include the following operations:

(1) S0: Sequentially traverse all translated code blocks; and if access proceeds to an end, perform operation S8: or otherwise, perform S1.

(2) S1: Extract a next to-be-accessed code block.

(3) S2: Determine whether all instructions in the translated code blocks are traversed; and if all the instructions are traversed, perform S0; or otherwise, perform S3.

(4) S3: Extract a next instruction.

(5) S4: Determine the instruction; and if the instruction is a function call instruction, perform S5: or otherwise, perform S2.

(6) S5: Obtain a location of the function call instruction, and record an address of an instruction following the function call instruction, that is, a translation function return address (TPC).

(7) S6: Search, by using the TPC recorded in S5, for an SPC corresponding to the TPC.

(8) S7: Fill the TPC and the SPC in an address cache table, and perform operation S2.

(9) S8: Recover a source program counter (SPC) on a program running stack by using a record in the return address cache table.

In the foregoing manner, a problem that a return address of a source software function cannot be obtained can be avoided in the solution of this embodiment of this application.

In one embodiment, the address of the return instruction may be modified. In this case, the first address mapping result stored at the target location in the running stack space is an inaccurate translation result (TPC). To obtain an accurate translation result (TPC), a modified address (a modified second address, for example, a modified SPC) of the return instruction needs to be obtained, and the second address mapping result is obtained based on the modified address of the return instruction. An instruction indicated by the second address mapping result is executed, while the first translation result is not executed.

In one embodiment, obtaining the second address mapping result of the second address based on the modified second address includes: obtaining, from the mapping relationship (for example, a preset mapping relationship between an SPC and a TPC) based on the modified second address, the second address mapping result corresponding to the modified second address: or performing address mapping on the modified second address, and obtaining the second address mapping result (for example, when the modified SPC is not found in the preset mapping relationship between the SPC and the TPC, address mapping may be newly performed on the modified SPC).

In one embodiment, when the address of the function return instruction in the running stack of the source software program is modified, a function return triggers an exception. For example, a SIGSEGV signal may be generated. In this case, the program may be controlled to enter a signal processing process. An SPC that triggers the exception is obtained in the signal processing process, and then a control flow is transferred to the execution engine. A TPC is searched for based on the SPC. Then, a translated code block corresponding to the TPC is executed, to resume normal running of the program.

In this embodiment of this application, the accurate translation result (for example, the TPC) is obtained by using an exception handling process only when the exception occurs because the program modifies the address of the function return instruction, so that the program correctly runs (a check process does not need to be performed each time), thereby ensuring integrity and also ensuring running efficiency of the program.

With reference to a specific schematic flowchart, the following describes a handling process performed when the exception occurs in this embodiment of this application. The handling process performed when the exception occurs may be shown in FIG. 10.

With reference to FIG. 10, a handling process performed when the exception occurs may include the following operations:

(1) Set a page attribute of a code segment of source software to inexecutable, and trigger execution of protection from the exception when execution of the program proceeds to an unexpected return address.

(2) A system automatically calls a corresponding exception handling program for execution. For the exception handling program, the system obtains a target address to which the instruction jumps when the exception is triggered, and uses the address as an SPC.

(3) Use the SPC obtained in (2) as an index to search for a corresponding TPC in a lookup table. If the TPC is not found, a translation procedure is triggered to generate code corresponding to the SPC, to obtain the TPC.

(4) Modify the return address on an exception handling program stack.

(5) The operating system transfers a control flow to an execution procedure when the exception handling program ends processing.

(6) In the execution procedure, recover a context required for execution of translated code, and then execute the code based on the TPC obtained in (3).

Figure 11:
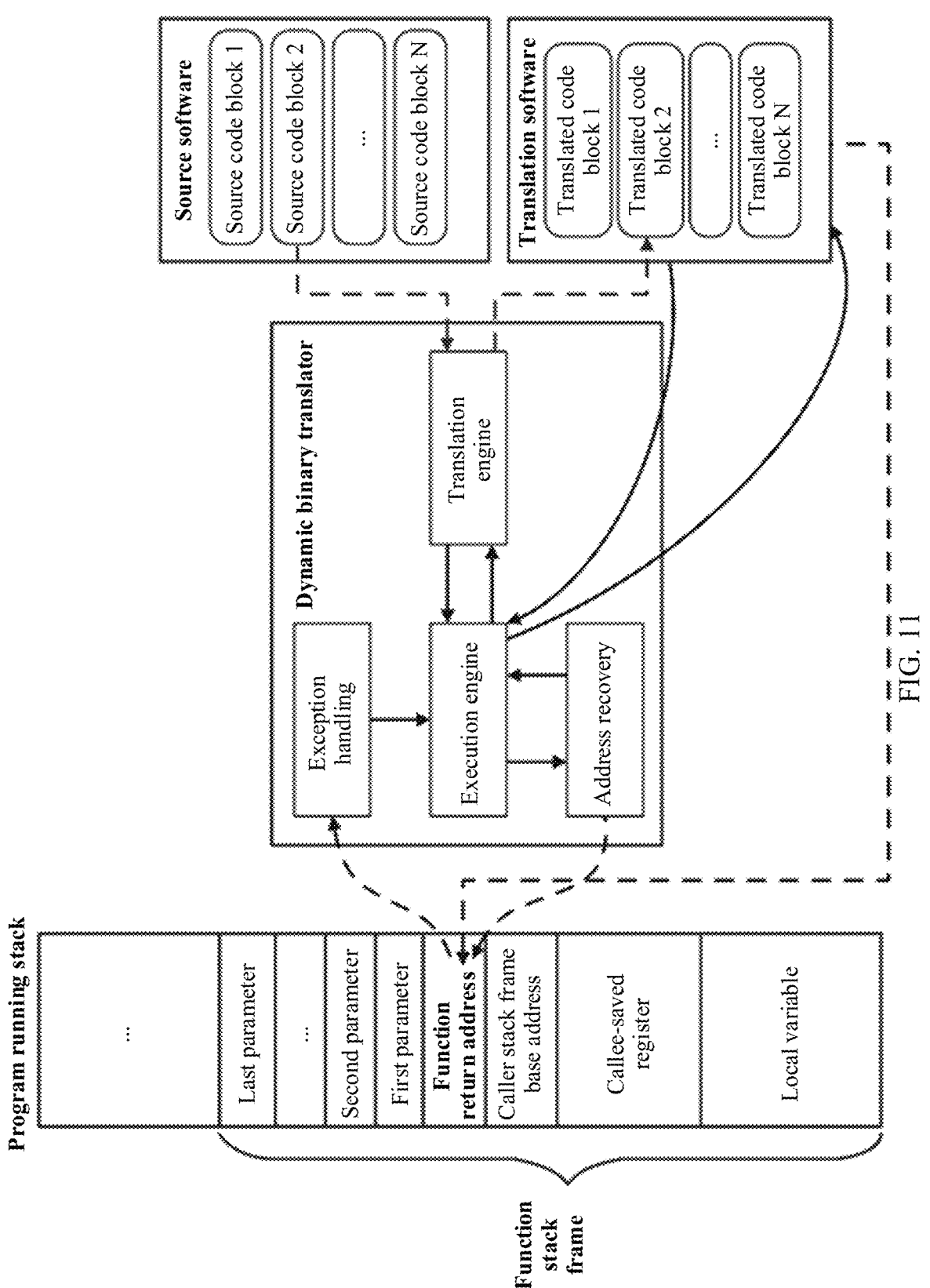
FIG. 11 is a diagram of an application architecture of a binary translation method according to this application.

FIG. 11 is a diagram of an architecture of an instruction translation method according to an embodiment of this application. A most obvious difference between the instruction translator in this embodiment of this application and a conventional dynamic binary translator is different locations for storing function return addresses. Unnecessary comparison can be reduced by storing a function return address in a stack address space, thereby accelerating program execution. Although program execution efficiency is improved in this embodiment of this application, some special cases are also introduced. An exception handling solution and a function return address recovery solution are further proposed for processing these cases. An example execution path is shown in FIG. 11. A dashed line represents a data flow; and a solid line represents a control flow:

An embodiment of this application provides an instruction translation method. The method includes: obtaining a return instruction of a function call instruction, where the function call instruction is used to instruct to call an instruction indicated by a first address, and the return instruction is used to instruct to execute, after the instruction indicated by the first address is executed according to the function call instruction, an instruction indicated by a second address; obtaining a first address mapping result based on the second address, where the first address mapping result is a mapping result of the second address: storing the first address mapping result in a running stack space; and obtaining a first translation result of the return instruction based on the return instruction, where the first translation result is a translation result of the return instruction, and the first translation result indicates to obtain, from the running stack space, an instruction indicated by the first address mapping result and execute the instruction. In a current existing function return address optimization solution, an independent data structure is used to store a mapping relationship between an SPC and a TPC of a return instruction, which requires an extra storage space. In addition, when the return instruction is changed, because the independent data structure storing the mapping relationship between the SPC and the TPC of the return instruction is not sensed, the SPC of the return instruction needs to be checked each time the return instruction is translated (no matter whether the return instruction is changed), which increases overheads during translation. In this embodiment of this application, a running stack space of a source program is reused. For example, a space (for example, an SPC) that is in the stack space and that is originally used to store an address of a return instruction is used to store the first address mapping result (for example, a TPC). There is no need to use an independent data structure to store the mapping relationship between the SPC and the TPC of the return instruction, thereby saving a storage space. In addition, because the running stack space can sense a change of a return instruction, the SPC of the return instruction does not need to be checked each time the return instruction is translated, thereby reducing overheads during translation and improving program running efficiency.

In addition, an embodiment of this application further provides an address recovery method. The method includes:

obtaining an access request, where the access request indicates to access a second address in a running stack space, the second address belongs to a return instruction, the return instruction is used to instruct to execute an instruction indicated by the second address, a first address mapping result of the second address is stored in the running stack space, and the first address mapping result is a mapping result of the second address; and replacing the first address mapping result in the running stack space with the second address based on the access request.

For specific descriptions of the address recovery method, refer to the descriptions of the embodiment corresponding to FIG. 5. Similarities are not described again.

In one embodiment, when a translated code block is run, an address of a return instruction (which may be briefly referred to as a return address, for example, the second address in this application) of a source software function may need to be accessed. For example, a libunwind library is loaded. Specifically, an SPC of the address of the return instruction needs to be obtained from a space of the return address in the running stack space. In this embodiment of this application, the space of the return address in the running stack space stores an address mapping result of the address of the return instruction (that is, the first address mapping result, for example, a TPC of the address of the return instruction). Therefore, the address of the return instruction needs to be recovered. In one embodiment, after the first translation result is obtained, in response to the access request for the second address, the first address mapping result in the running stack space is replaced with the second address. For example, the TPC of the return instruction may be replaced with the SPC of the return instruction.

In one embodiment, the first address mapping result of the second address is stored at a target location in the running stack space. The target location is a location corresponding to the second address in the running stack space. The replacing the first address mapping result in the running stack space with the second address includes: replacing the first address mapping result in the target location in the running stack space with the second address.

In one embodiment, the second address is a source program counter SPC, and the first address mapping result is a target program counter TPC of the second address.

In one embodiment, the method further includes: before the replacing the first address mapping result in the running stack space with the second address, the method further includes: generating a mapping relationship, where the mapping relationship includes a correspondence between the source program counter and the target program counter; and obtaining, from the mapping relationship, the second address corresponding to the first address mapping result.

In this embodiment of this application, in comparison with a case of maintaining the correspondence between the source program counter and the target program counter in real time, a case of generating the correspondence between the source program counter and the target program counter only when the source program counter needs to be accessed can reduce occupation for a storage resource.

Figure 12:
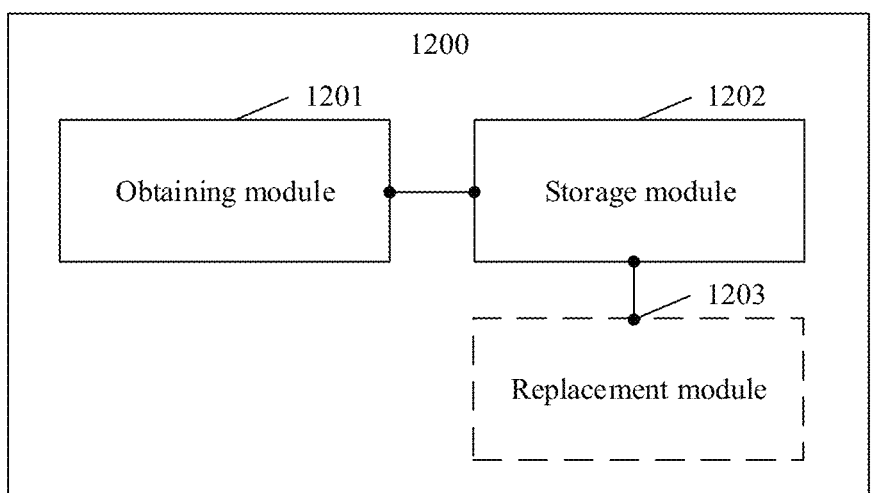
FIG. 12 is a diagram of a structure of a binary translation apparatus according to an embodiment.

FIG. 12 is a diagram of a structure of an instruction translation apparatus according to an embodiment of this application. As shown in FIG. 12, the instruction translation apparatus 1200 provided in this embodiment of this application includes an obtaining module 1201 and a storage module 1202.

The obtaining module 1201 is configured to: obtain a return instruction of a function call instruction, where the function call instruction is used to instruct to call an instruction indicated by a first address, and the return instruction is used to instruct to execute, after the instruction indicated by the first address is executed according to the function call instruction, an instruction indicated by a second address; and
   obtain a first address mapping result based on the second address, where the first address mapping result is a mapping result of the second address.

The storage module 1202 is configured to store the first address mapping result in a running stack space.

The obtaining module 1201 is further configured to obtain a first translation result of the return instruction based on the return instruction. The first translation result is a translation result of the return instruction. The first translation result indicates to obtain, from the running stack space, an instruction indicated by the first address mapping result and execute the instruction.

For specific descriptions of the obtaining module 1201, refer to the descriptions of operation 501, operation 502, and operation 504 in the foregoing embodiment. Details are not described herein again.

For specific descriptions of the storage module 1202, refer to the descriptions of operation 503 in the foregoing embodiment. Details are not described herein again.

In one embodiment, the storage module is specifically configured to:
   store the first address mapping result at a target location in the running stack space, where the target location is a location corresponding to the second address in the running stack space.

In one embodiment, the second address is a source program counter SPC, and the first address mapping result is a target program counter TPC of the second address.

In one embodiment, the apparatus further includes:
   a replacement module 1203, configured to: after the first address mapping result is stored in the running stack space, replace the first address mapping result in the running stack space with the second address based on an access request for the second address.

In one embodiment, after the first address mapping result is stored in the running stack space, the second address is modified, and the obtaining module is further configured to:
   obtain a second address mapping result based on a modified second address, where the second address mapping result is a mapping result of the modified second address.

The apparatus further includes:
   an execution module, configured to: execute an instruction indicated by the second address mapping result, and skip executing the first mapping result.

In one embodiment, the obtaining module is specifically configured to:
   perform address mapping on the modified second address, to obtain the second address mapping result.

In one embodiment, the obtaining module is further configured to:
   obtain a second translation result based on the function call instruction, where the second translation result is a translation result of the function call instruction.

An embodiment of this application further provides an address recovery apparatus. The apparatus includes an obtaining module and a replacement module.

The obtaining module is configured to obtain an access request. The access request indicates to access a second address in a running stack space. The second address belongs to a return instruction. The return instruction is used to instruct to execute an instruction indicated by the second address. A first address mapping result of the second address is stored in the running stack space. The first address mapping result is a mapping result of the second address.

The replacement module is configured to replace the first address mapping result in the running stack space with the second address based on the access request.

In one embodiment, the first address mapping result of the second address is stored at a target location in the running stack space, and the target location is a location corresponding to the second address in the running stack space.

In one embodiment, the second address is a source program counter SPC, and the first address mapping result is a target program counter TPC of the second address.

In one embodiment, the obtaining module is further configured to:

before the first address mapping result in the running stack space is replaced with the second address, generate a mapping relationship, where the mapping relationship includes a correspondence between the source program counter and the target program counter; and obtain, from the mapping relationship, the second address corresponding to the first address mapping result.

Figure 13:
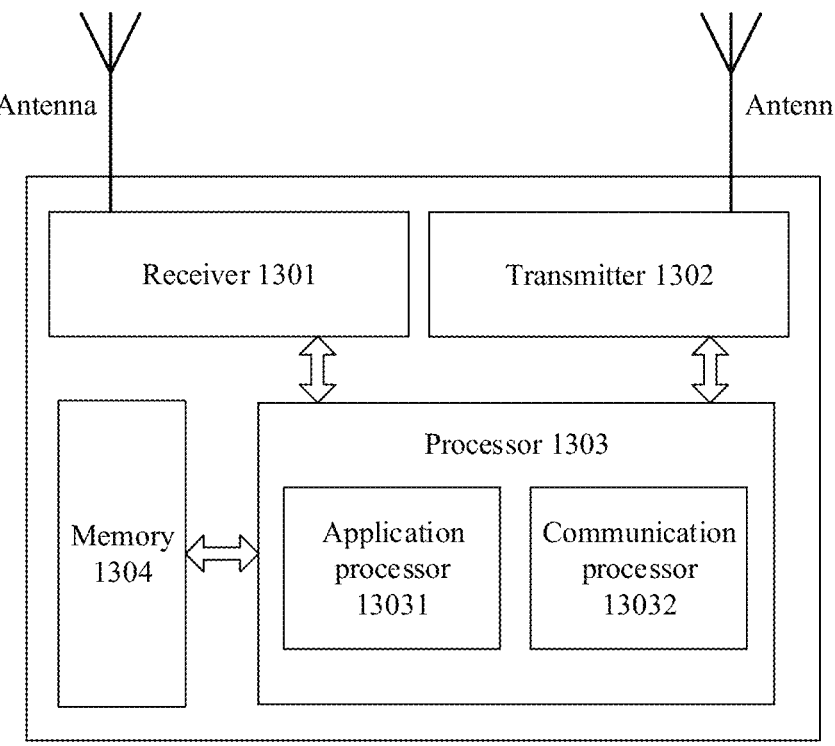
FIG. 13 is a diagram of a structure of a terminal device according to an embodiment.

The following describes a terminal device according to an embodiment of this application. FIG. 13 is a diagram of a structure of a terminal device according to an embodiment of this application. The terminal device 1300 may be specifically a virtual reality VR device, a mobile phone, a tablet, a notebook computer, an intelligent wearable device, or the like. This is not limited herein. Specifically, the terminal device 1300 includes a receiver 1301, a transmitter 1302, a processor 1303, and a memory 1304 (there may be one or more processors 1303 in the terminal device 1300, and one processor is used as an example in FIG. 13). The processor 1303 may include an application processor 13031 and a communication processor 13032. In some embodiments of this application, the receiver 1301, the transmitter 1302, the processor 1303, and the memory 1304 may be connected through a bus or in another manner.

The memory 1304 may include a read-only memory and a random access memory, and provide instructions and data to the processor 1303. A part of the memory 1304 may further include a non-volatile random access memory (NVRAM). The memory 1304 stores a processor and operation instructions, an executable module or a data structure, a subset thereof, or an extended set thereof. The operation instructions may include various operation instructions for implementing various operations.

The processor 1303 controls an operation of the terminal device. In specific application, components of the terminal device are coupled together by using a bus system. In addition to a data bus, the bus system may further include a power bus, a control bus, a status signal bus, and the like. However, for clear description, various types of buses in the figure are marked as the bus system.

The method disclosed in the foregoing embodiments of this application may be applied to the processor 1303, or may be implemented by the processor 1303. The processor 1303 may be an integrated circuit chip and has a signal processing capability. In an implementation process, operations in the foregoing methods may be completed by using a hardware integrated logic circuit in the processor 1303, or by using instructions in a form of software. The processor 1303 may be a general-purpose processor, a digital signal processor (DSP), a microprocessor, or a microcontroller, and may further include an application-specific integrated circuit (ASIC), a field-programmable gate array (FPGA) or another programmable logic device, a discrete gate or transistor logic device, or a discrete hardware assembly. The processor 1303 may implement or perform the methods, operations, and logic block diagrams disclosed in embodiments of this application. The general-purpose processor may be a microprocessor, or the processor may be any conventional processor or the like. The operations in the methods disclosed with reference to embodiments of this application may be directly performed and completed by a hardware decoding processor, or may be performed and completed by using a combination of hardware in the decoding processor and a software module. A software module may be located in a mature storage medium in the art, such as a random access memory, a flash memory, a read-only memory, a programmable read-only memory, an electrically erasable programmable memory, or a register. The storage medium is located in the memory 1304, and the processor 1303 reads information in the memory 1304 and completes the operations in the foregoing methods in combination with hardware of the processor.

The receiver 1301 may be configured to receive input digital or character information, and generate signal input related to a related setting and function control of the terminal device. The transmitter 1302 may be configured to output digital or character information through a first interface. The transmitter 1302 may be further configured to send instructions to a disk pack through the first interface, to modify data in the disk pack. The transmitter 1302 may further include a display device, for example, a display.

Figure 14:
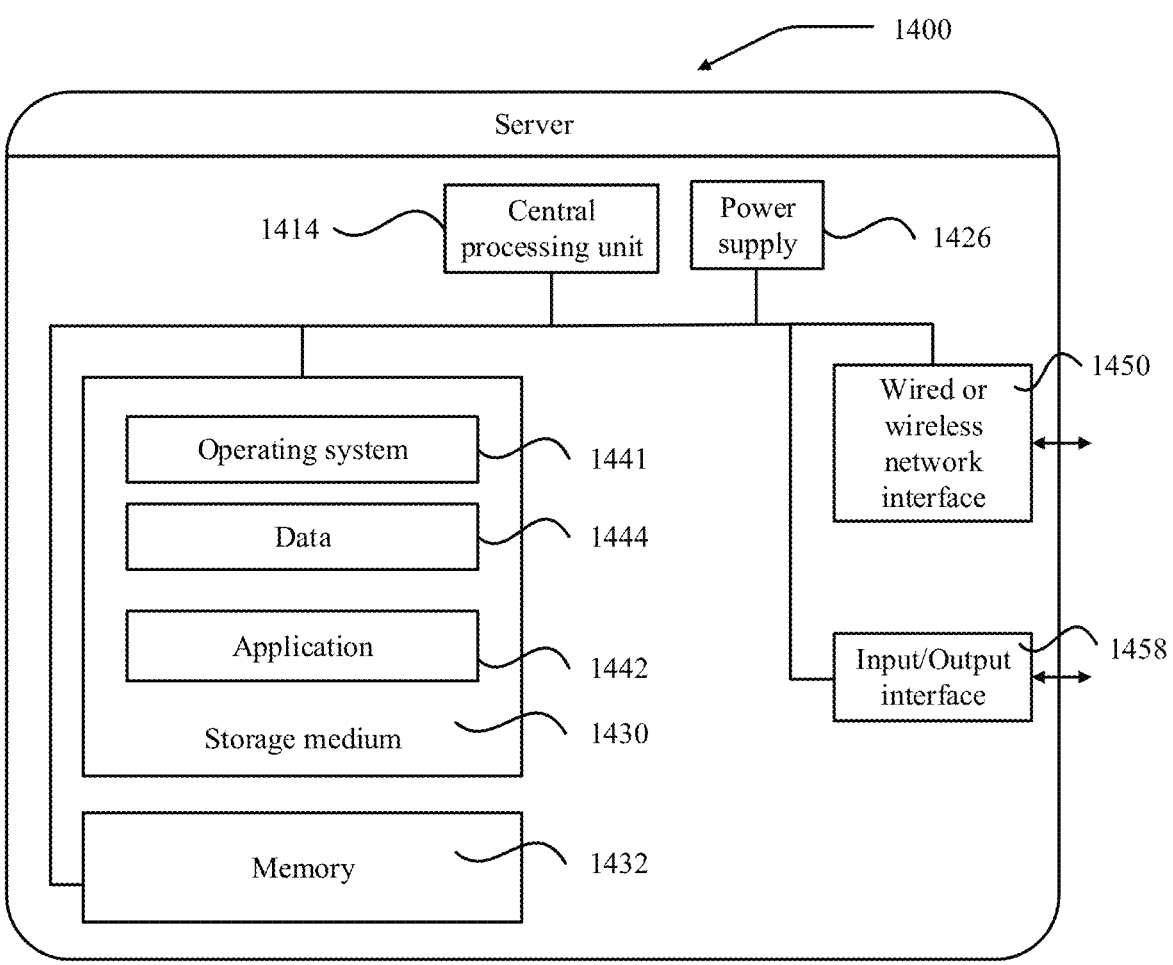
FIG. 14 is a diagram of a structure of a server according to this application.

An embodiment of this application further provides a server. FIG. 14 is a diagram of a structure of a server according to an embodiment of this application. Specifically, the server 1400 is implemented by one or more servers. The server 1400 may vary greatly due to different configurations or performance, and may include one or more central processing units (CPUs) 1414 (for example, one or more processors) and a memory 1432, and one or more storage media 1430 (for example, one or more mass storage devices) that stores an application 1442 or data 1444. The memory 1432 and the storage medium 1430 may be transient storage or persistent storage. A program stored in the storage medium 1430 may include one or more modules (not shown in the figure), and each module may include a series of instruction operations of the server. Further, the central processing unit 1414 may be set to communicate with the storage medium 1430, and perform, on the server 1400, the series of instruction operations in the storage medium 1430.

The server 1400 may further include one or more power supplies 1426, one or more wired or wireless network interfaces 1450, one or more input/output interfaces 1458; and/or one or more operating systems 1441, for example, Windows Server™, Mac OS X™. Unix™. Linux™, and FreeBSD™.

In this embodiment of this application, the central processing unit 1414 is configured to perform the instruction translation method described in the embodiment corresponding to FIG. 5.

It may be clearly understood by persons skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, another network device) to perform all or some of the operations of the methods described in the embodiment in FIG. 2 of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

The invention claimed is:

1. An instruction translation method, comprising:
obtaining a return instruction of a function call instruction to instruct to call an instruction indicated by a first address, and the return instruction is used to instruct to execute, after the instruction indicated by the first address is executed according to the function call instruction, an instruction indicated by a second address;
obtaining a first address mapping result based on the second address, wherein the first address mapping result is a mapping result of the second address;
storing the first address mapping result in a running stack space; and
obtaining a first translation result of the return instruction based on the return instruction, wherein the first translation result is a translation result of the return instruction, and the first translation result indicates to obtain, from the running stack space, an instruction indicated by the first address mapping result and execute the instruction.

2. The method according to claim 1, wherein the storing the first address mapping result in the running stack space comprises:
storing the first address mapping result at a target location in the running stack space, wherein the target location is a location corresponding to the second address in the running stack space.

3. The method according to claim 1 wherein the second address is a source program counter (SPC), and the first address mapping result is a target program counter (TPC) of the second address.

4. The method according to claim 1, wherein after the storing the first address mapping result in the running stack space, the method further comprising:
replacing the first address mapping result in the running stack space with the second address based on an access request for the second address.

5. The method according to claim 1, wherein after the storing the first address mapping result in the running stack space, the second address is modified, the method further comprising:
obtaining a second address mapping result based on a modified second address, wherein the second address mapping result is a mapping result of the modified second address; and
executing an instruction indicated by the second address mapping result, and skipping executing the first address mapping result.

6. The method according to claim 5, wherein the obtaining the second address mapping result of the second address based on the modified second address comprises:
performing an address mapping on the modified second address, to obtain the second address mapping result.

7. The method according to claim 1, further comprising:
obtaining a second translation result based on the function call instruction, wherein the second translation result is a translation result of the function call instruction.

8. An apparatus for an instruction translation, comprising:
a processor; and
a memory coupled to the processor to store instructions, which when executed by the processor, cause the apparatus to:
obtain a return instruction of a function call instruction to instruct to call an instruction indicated by a first address, and the return instruction is used to instruct to execute, after the instruction indicated by the first address is executed according to the function call instruction, an instruction indicated by a second address;
obtain a first address mapping result based on the second address, wherein the first address mapping result is a mapping result of the second address;
store the first address mapping result in a running stack space; and
obtain a first translation result of the return instruction based on the return instruction, wherein the first translation result is a translation result of the return instruction, and the first translation result indicates to obtain, from the running stack space, an instruction indicated by the first address mapping result and execute the instruction.

9. The apparatus according to claim 8, wherein the apparatus is further caused to store the first address mapping result at a target location in the running stack space, wherein the target location is a location corresponding to the second address in the running stack space.

10. The apparatus according to claim 8, wherein the second address is a source program counter (SPC), and the first address mapping result is a target program counter (TPC) of the second address.

11. The apparatus according to claim 8, wherein the apparatus is further caused to:

after the first address mapping result is stored in the running stack space, replace the first address mapping result in the running stack space with the second address based on an access request for the second address.

12. The apparatus according to claim 8, wherein after the first address mapping result is stored in the running stack space, the second address is modified, the apparatus is further caused to:

obtain a second address mapping result based on a modified second address, wherein the second address mapping result is a mapping result of the modified second address; and execute an instruction indicated by the second address mapping result, and skip executing the first address mapping result.

13. A non-transitory computer-readable storage medium having instructions stored therein, which when executed by a processor, cause the processor to perform obtaining a return instruction of a function call instruction to instruct to call an instruction indicated by a first address, and the return instruction is used to instruct to execute, after the instruction indicated by the first address is executed according to the function call instruction, an instruction indicated by a second address;

obtaining a first address mapping result based on the second address, wherein the first address mapping result is a mapping result of the second address;

storing the first address mapping result in a running stack space; and obtaining a first translation result of the return instruction based on the return instruction, wherein the first translation result is a translation result of the return instruction, and the first translation result indicates to obtain, from the running stack space, an instruction indicated by the first address mapping result and execute the instruction.

14. A computing device, comprising:

a processor; and a memory coupled to the processor to store instructions, which when executed by the processor, cause the processor to perform obtaining a return instruction of a function call instruction to instruct to call an instruction indicated by a first address, and the return instruction is used to instruct to execute, after the instruction indicated by the first address is executed according to the function call instruction, an instruction indicated by a second address;

obtaining a first address mapping result based on the second address, wherein the first address mapping result is a mapping result of the second address;

storing the first address mapping result in a running stack space; and obtaining a first translation result of the return instruction based on the return instruction, wherein the first translation result is a translation result of the return instruction, and the first translation result indicates to obtain, from the running stack space, an instruction indicated by the first address mapping result and execute the instruction.

15. The non-transitory computer-readable storage medium according to claim 13, wherein the storing the first address mapping result in the running stack space comprises:

storing the first address mapping result at a target location in the running stack space, wherein the target location is a location corresponding to the second address in the running stack space.

16. The non-transitory computer-readable storage medium according to claim 13, wherein the second address is a source program counter (SPC), and the first address mapping result is a target program counter (TPC) of the second address.

17. The non-transitory computer-readable storage medium according to claim 13, wherein after the storing the first address mapping result in the running stack space, the instructions when executed by the processor, further cause the processor to perform:

replacing the first address mapping result in the running stack space with the second address based on an access request for the second address.

18. The computing device according to claim 14, wherein the storing the first address mapping result in the running stack space comprises:

storing the first address mapping result at a target location in the running stack space, wherein the target location is a location corresponding to the second address in the running stack space.

19. The computing device according to claim 14, wherein the second address is a source program counter (SPC), and the first address mapping result is a target program counter (TPC) of the second address.

20. The computing device according to claim 14, wherein after the storing the first address mapping result in the running stack space, the instructions when executed by the processor, further cause the processor to perform:

replacing the first address mapping result in the running stack space with the second address based on an access request for the second address.

* * * * *